United States Statutory Invention Registration [19]

[11] Reg. Number: H838

Ohst [43] Published: Nov. 6, 1990

[54] VARIABLE RESISTIVITY SLIP RING

[75] Inventor: David W. Ohst, Livermore, Calif.

[73] Assignee: The United States of America as represented by the Secretary of the Army, Washington, D.C.

[21] Appl. No.: 488,817

[22] Filed: Feb. 26, 1990

[51] Int. Cl.[5] ..... H02K 31/00

[52] U.S. Cl. ..... 310/178

*Primary Examiner*—Thomas H. Tarcza
*Assistant Examiner*—Linda J. Wallace
*Attorney, Agent, or Firm*—Anthony T. Lane; Edward Goldberg; Michael C. Sachs

[57] ABSTRACT

The series wound, air core (SWAC) homopolar generator includes a pair of coils connected in series with a rotor having a pair of slip rings joined by conductive bars. To reduce eddy currents induced in the slip rings, their radius and axial length are chosen such that the circumferential and axial resistances of the slip rings fall in a bounded region wherein the axial resistance is minimized and the circumferential resistance is maximized.

6 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

VARIABLE RESISTIVITY SLIP RING

GOVERNMENT INTEREST

The invention described herein was made in the course of or under contract No. DAAA21-85-C-0214 with the Government and may be manufactured, used and licensed by or for the Government for governmental purposes without the payment to me of any royalties thereon.

BACKGROUND OF THE INVENTION

1. Field of the Invention

The present invention relates to electric power generators and, more particularly, to series wound, air core (SWAC) homopolar DC generators.

2. Description of the Prior Art

In the field of tactical military weapons design, it is often necessary to employ high-power DC generators to operate the weapons. For example, in kinetic energy artillery weapons, DC generators are often used to produce a high-energy electric power pulse for electromagnetic railguns. In order to obtain the necessary high power densities required for such weapon systems, high efficiency generators having low power losses must be designed. An important source of power losses that often contributes to lower efficiencies in series wound air core (SWAC) homopolar generators is eddy currents that are induced in various generator structures. The most critical areas of induced eddy currents are often the generator slip rings which are usually closely coupled to the generator windings. Although there has been a long recognized need for simple design procedures that may be used to produce generator slip rings that significantly reduce eddy currents in SWAC homopolar generators, no practical system for doing so has yet been devised. The present invention fulfills this need.

SUMMARY OF THE INVENTION

The general purpose of this invention is to provide a SWAC homopolar generator which embraces all the advantages of similarly employed generators and possesses none of the aforedescribed disadvantages. To attain this, the present invention contemplates a unique generator design wherein axial and circumferential slip ring resistances are designed to limit unwanted eddy currents while permitting significant load currents to pass.

It is, therefore, an object of the present invention to provide an air core homopolar generator with a variable resistance slip ring.

Other objects and features of the invention will become apparent to those skilled in the art as the disclosure is made in the following description of a preferred embodiment of the invention as illustrated in the accompanying sheets of drawing.

DETAILED DESCRIPTION OF THE PREFERRED EMBODIMENT

Figure 1:
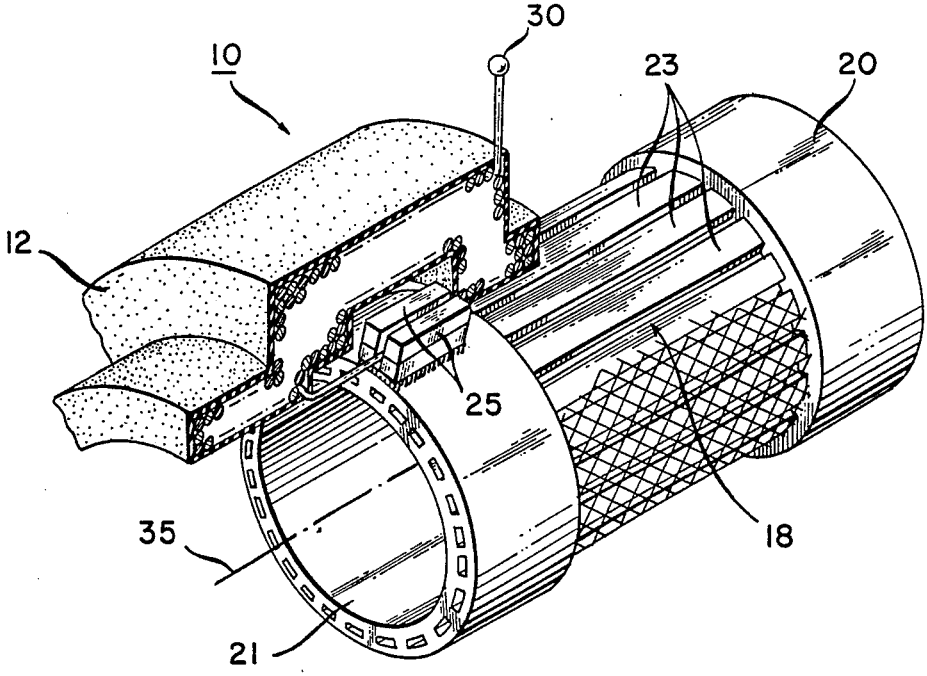
FIG. 1 is a pictorial view, with parts broken away, of the preferred embodiment.
Figure 2:
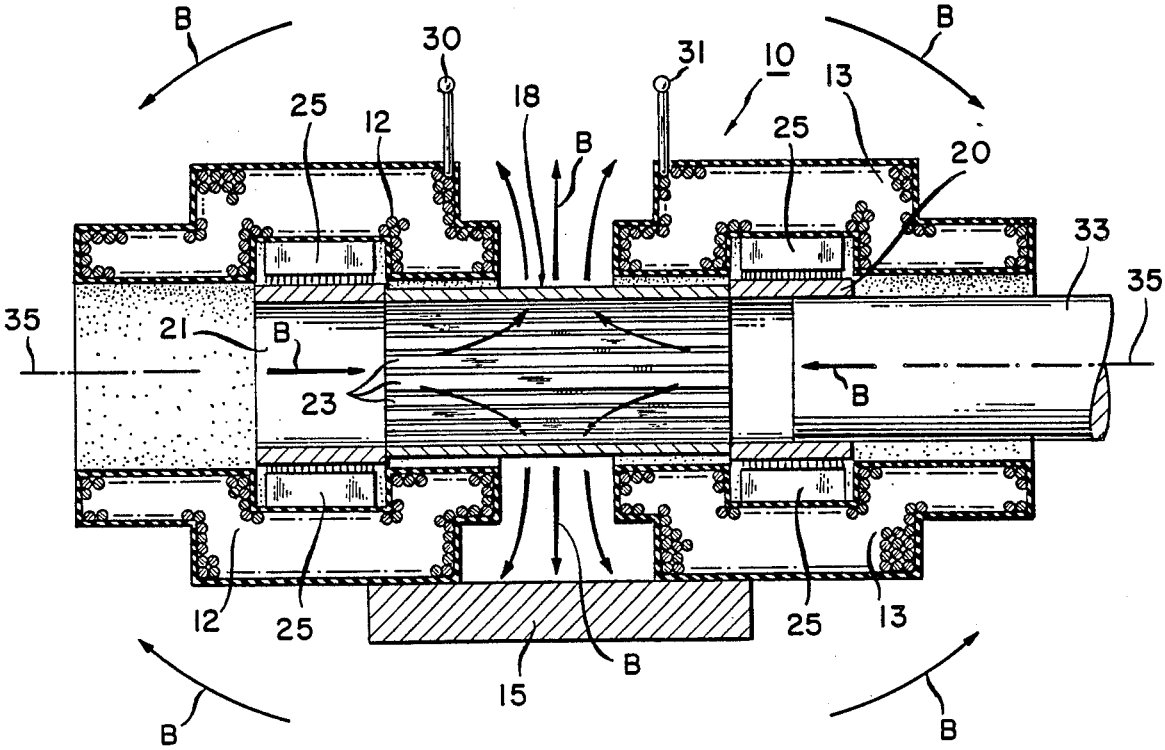
FIG. 2 is an elevation in section of the device shown in FIG. 1.

Referring now to the drawings, there is shown in FIGS. 1 and 2 a SWAC homopolar generator 10 having stator windings 12, 13 fixed to a base 15. A rotor 18 includes a pair of slip rings 20, 21 joined by a plurality of rigid conductive bars 23 to form a cylindrical structure. The windings 12, 13 and rotor 18 are arranged coaxially with each other such that winding 12 surrounds the exterior of ring 21 and winding 13 surrounds the exterior of ring 20. A plurality of brush boxes 25 are fixed in concentric grooves in windings 12, 13. Brush boxes 25 have resilient conductive filaments that are in slidable contact with the outer surface of rings 20, 21. The brush boxes 25 are also in electrical contact with one end of the respective windings 12, 13 on which they are fixed. The other ends of windings 12, 13 have output terminals 30, 31, respectively, connected thereto. A shaft 33 is fixed to the ring 20 for rotating the rotor 18 about axis 35.

The windings 12, 13 are connected in series with the rotor 18 such that a common current will flow from terminal 30 through winding 12 to slip ring 21 via brush boxes 25. This current will continue from ring 21 through bars 23 to ring 20 and onto winding 13 via brush boxes 25. The current will exit terminal 31. The windings 12, 13 are wound in opposite directions so that the common current flowing therethrough will produce magnetic fields (B) in opposite directions along the axis 35 but in a common radial direction in the plane perpendicular to the axis 35 midway between the windings 12, 13. The arrows represent the magnetic flux lines of the field (B) produced by windings 12, 13.

Operation of the generator 10 is as follows: The shaft 33 rotates the rotor 18. An initial feed voltage is applied externally to the terminals 30, 31 to cause a current to flow in the windings 12, 13. As the rotor 18 turns the conductive bars 23 will cut the flux lines (B) thereby generating a current flow in the bars 23. The external feed voltage is then removed, permitting the currents induced in bars 23 to flow in windings 12, 13 via slip rings 20, 21 and brush boxes 25. The magnetic field (B) produced by the currents in windings 12, 13 will induce further currents in bars 23. Eddy currents will also be induced in the circumferential direction in the slip rings 20, 21 due to changes in the flux (B) that are caused, for example, during start-up or by changes in the speed of rotation of the shaft 33. More specifically, when used for firing weapons, the generator 10 will produce a time varying "DC" pulse caused by changes in the rotational speed of shaft 33 which may be powered by a turbin or the like. The magnetic field (B) produced by the windings 12, 13 will also be time varying. Additionally, it is noted that the slip rings 20, 21 are well coupled magnetically to the windings 12, 13, respectively, much like a shorted transformer secondary winding. These two conditions will produce significant eddy currents in the slip rings 12, 13. These currents will flow circumferentially to oppose the change in magnetic flux (B) of generator 10.

For proper performance of the generator 10, the total (terminal 30-to-terminal 31) resistance must be minimized so that the load current can reach its required value. A total resistance between terminals 30, 31 of no more than 25 micro-ohms is representative for a typical SWAC homopolar generator 10. Accounting for other component resistance in this typical generator, the slip rings 20, 21 would have a representative axial resistance of less than 5 micro-ohms so as not to seriously interfer with the load currents. However, at the same time, the slip ring circumferential resistance of this typical generator must be much larger, e.g. at least 150 micro ohms, to limit eddy currents in the slip rings 20, 21. As such, a method of tuning resistance in both directions is necessary.

Figure 3:
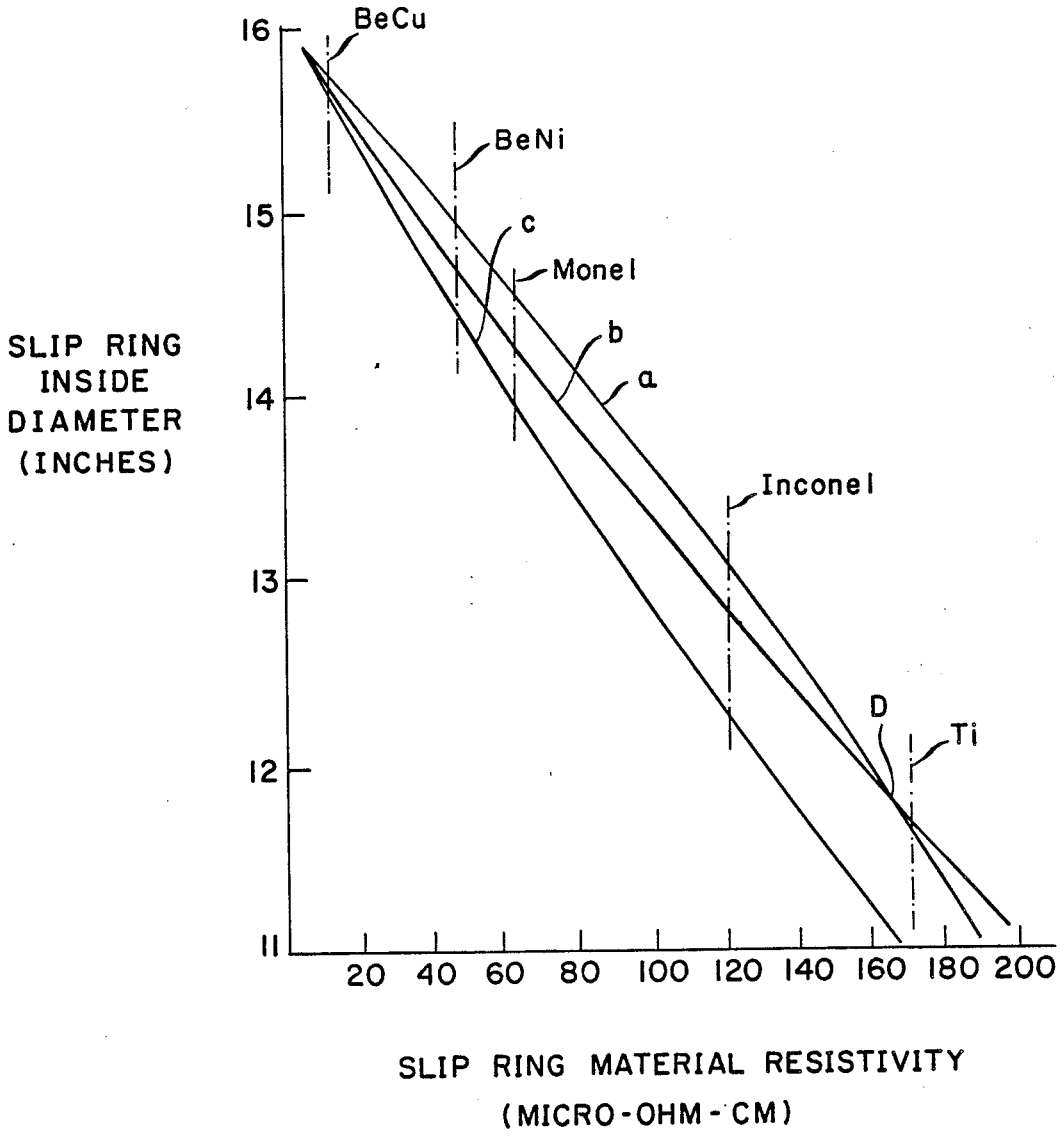
FIG. 3 is a graph useful in understanding the principles of the present invention.

FIG. 3 illustrates the relationships between critical slip ring parameters that must be considered in designing generator 10. FIG. 3 is a representative plot of three curves for slip rings 20, 21 having the following specifications: the outside diameter is sixteen inches, the axial length of each ring 20, 21 is nine inches and the axial resistance of each ring 20, 21 is no greater than five micro-ohms. The vertical axis ranges from eleven to sixteen inches for the inside diameter of the rings 20, 21 while the horizontal axis ranges from zero to 200 micro-ohm-centimeters for the resistivity of the material used to fabricate rings 20, 21. Three curves are plotted on the FIG. 3 graph. Curve a represents the inside diameter and resistivity values for a ring having an axial resistance of five micro-ohms. Curves b and c represent the inside diameter and resistivity values for a ring having a circumferential resistance of 150 and 125 micro-ohms, respectively. Also indicated on the FIG. 3 graph are vertical lines that intersect the curves a, b, c for the various alloys listed thereon. A typical alloy of beryllium copper, BeCu, has a resistivity of about ten micro-ohm-cm. Vertical lines for other typical alloys from which the rings 20, 21 may be fabricated are also shown, i.e. beryllium nickel, BeNi, Monel, Inconel and Titanium, Ti. The FIG. 3 graph illustrates that for a slip ring having an outside diameter of sixteen inches, an axial length of nine inches, an axial resistance of no more than five micro-ohms and a circumferential resistance of no less than 150 micro-ohms, the designer may use the alloy Inconel to fabricate the slip rings 20, 21 because it has the required resistivity (about 120 micro-ohm-cm). The graph further indicates that the inside diameter of the slip rings 20, 21 must fall somewhere between 12.7 and 13.1 inches. If the inside diameter is to be greater than 13.1, the Inconel alloy will have a resistivity that is too large to meet the requirement that the axial resistance be less than five micro-ohms. As such an alloy having less resistivity must be selected. On the other hand, if the inside diameter of rings 20, 21 are to be less than 12.7 inches, the resistivity of the Inconel alloy will not be sufficient to insure that the circumferential resistance is at least 150 micro-ohms to reduce eddy currents. An alloy having a greater resistivity will be necessary. Point D on the graph illustrates the lower bound (about 11.7 inches) for the inside diameter of the rings 20, 21 and the upper bound (about 170 micro-ohm-cm) for the resistivity. For example, if it is desirable that the rings 20, 21 be made of titanium then the specifications for the ring must change. If the limit for the circumferential resistance is lowered to 12.5 micro-ohms (curve c) or greater, then it would be possible to construct a titanium ring with an inside diameter from 11.0 to 11.5 inches.

As such, a plot similar to that shown in FIG. 3 may be used to design slip rings 20, 21. For any set of resistance limits, slip ring materials can be quickly selected. Also, for various materials, the slip ring dimensions may be read from the graph.

The foregoing disclosure and drawings are merely illustrative of the principles of this invention and are not to be interpreted in a limiting sense. It is to be understood that the invention should not be limited to the exact details of construction shown and described because obvious modifications will occur to a person skilled in the art.

What is claimed is:

1. A SWAC homopolar generator comprising:

a rotor having first and second slip rings with different resistances in orthogonal directions and a plurality of conductors connected therebetween;

first and second coils mounted adjacent said first and second slip rings, respectively; and a plurality of conductive brushes slidably contacting said slip rings and connected to one end of the respective coils.

2. The generator of claim 1 wherein said slip rings are cylindrical in shape and are mounted coaxially with each other.

3. The generator of claim 2 wherein said coils are mounted concentric with said slip rings.

4. The generator of claim 3 wherein said conductors are rigid bars connected between said slip rings to form a cylindrical surface.

5. The generator of claim 4 wherein the circumferential resistance of said slip rings is significantly higher than the axial resistance of said slip rings.

6. The generator of claim 5 wherein the circumferential resistance is a maximum and the axial resistance is a minimum whereby eddy currents in the circumferential direction are limited while load currents in the axial direction are permitted to pass.

* * * * *